United States Patent
Easley et al.

(10) Patent No.: US 8,978,621 B2
(45) Date of Patent: Mar. 17, 2015

(54) PISTON HAVING COMBUSTION BOWL SHAPED TO BALANCE COMBUSTION EFFICIENCY AND EMISSION PROPERTIES

(75) Inventors: William L. Easley, Dunlap, IL (US); David A. Pierpont, Dunlap, IL (US); Karthikeyan C. Venkatasubramaniam, Dunlap, IL (US); John P. Timmons, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 927 days.

(21) Appl. No.: 13/088,659

(22) Filed: Apr. 18, 2011

(65) Prior Publication Data
US 2011/0253096 A1 Oct. 20, 2011

Related U.S. Application Data

(60) Provisional application No. 61/326,161, filed on Apr. 20, 2010.

(51) Int. Cl.
*F02B 23/06* (2006.01)
*F02F 3/26* (2006.01)
(Continued)

(52) U.S. Cl.
CPC ......... *F02B 23/0672* (2013.01); *F02B 23/0693* (2013.01); *F02D 21/08* (2013.01); *F02B 23/0621* (2013.01); *F02B 23/0624* (2013.01); *F02B 23/0669* (2013.01); *F02B 2275/14* (2013.01);
(Continued)

(58) Field of Classification Search
CPC .. F02B 23/06; F02B 23/0672; F02B 23/0696; F02F 3/26

USPC .............. 123/193.6, 263, 274, 276, 279, 294, 123/306; 92/172
See application file for complete search history.

(56) References Cited

U.S. PATENT DOCUMENTS 2,870,754 A * 1/1959 Morris ........................... 123/263
4,953,528 A * 9/1990 Oikawa et al. ................. 123/276
(Continued)

FOREIGN PATENT DOCUMENTS

CA    2178012 A1    12/1997
CN    201751557 U    2/2011
(Continued)

*Primary Examiner* — Mahmoud Gimie
*Assistant Examiner* — David Hamaoui
(74) *Attorney, Agent, or Firm* — Baker & Hostetler LLP

(57) ABSTRACT

A piston for a compression ignition internal combustion engine includes a piston body having a combustion face defining a combustion bowl, and the combustion face including a compound bowl surface and a compound rim surface. The combustion face is profiled to balance a combustion efficiency property of the piston with emissions properties of the piston, and includes a profile of rotation defining a convex curve segment bisected by the longitudinal axis, and a plurality of concave curve segments outboard of the convex curve segment. The profile of rotation further includes a compound rim profile defining a plurality of convex curve segments corresponding to an inner rim surface. The convex curve segment of the compound bowl profile defines a relatively small radius of curvature, and the plurality of convex curve segments corresponding to the inner rim surface define a relatively large radius of curvature. The combustion face includes an abrupt transition from the compound bowl surface to the compound rim surface.

18 Claims, 8 Drawing Sheets

(51) Int. Cl.
*F02D 21/08* (2006.01)
*F02M 25/07* (2006.01)

(52) U.S. Cl.
CPC .......... *F02M 25/0727* (2013.01); *Y02T 10/125* (2013.01); *Y02T 10/123* (2013.01)
USPC ........ 123/279; 123/193.6; 123/263; 123/276; 123/294

(56) References Cited

U.S. PATENT DOCUMENTS

| | | | |
|---|---|---|---|
| 5,081,968 A * | 1/1992 | Bruni | 123/193.6 |
| 5,816,229 A | 10/1998 | Roderweiss et al. | |
| 5,970,946 A | 10/1999 | Shea et al. | |
| 6,705,273 B1 * | 3/2004 | Liu et al. | 123/263 |
| 6,732,703 B2 | 5/2004 | Eckerle et al. | |
| 6,745,745 B2 | 6/2004 | Huebler et al. | |
| 6,966,294 B2 | 11/2005 | Eckerle et al. | |
| 6,997,158 B1 | 2/2006 | Liu | |
| 7,025,031 B2 | 4/2006 | Mahakul et al. | |
| 7,131,418 B2 * | 11/2006 | Wieland | 123/193.6 |
| 7,210,448 B2 | 5/2007 | Stanton et al. | |
| 7,431,012 B1 | 10/2008 | Glenn et al. | |
| 8,276,563 B2 * | 10/2012 | Quigley et al. | 123/274 |
| 8,770,168 B2 * | 7/2014 | Cornwell et al. | 123/193.6 |
| 2003/0226538 A1 | 12/2003 | Eckerle et al. | |
| 2005/0188944 A1 | 9/2005 | Mahakul et al. | |
| 2010/0108044 A1 | 5/2010 | Liu | |
| 2011/0253096 A1 | 10/2011 | Easley et al. | |
| 2013/0239925 A1 * | 9/2013 | Karch et al. | 123/294 |

FOREIGN PATENT DOCUMENTS

| | | |
|---|---|---|
| DE | 102005044503 A1 | 4/2007 |
| EP | 0945602 | 9/1999 |
| EP | 0849448 | 3/2000 |
| EP | 1561924 A1 | 10/2005 |
| FR | 2864581 | 7/2005 |
| JP | 2-12028 U | 1/1990 |
| JP | H03210021 | 9/1991 |
| JP | 10-184365 A | 7/1998 |
| JP | 2000234521 | 8/2000 |
| JP | 2001-115843 A | 4/2001 |
| JP | 2007-051591 A | 3/2007 |
| JP | 2009-513855 A | 4/2009 |
| JP | 2009-150361 A | 7/2009 |
| WO | 98/55743 A1 | 12/1998 |

* cited by examiner

|  | Engine 1 | Engine 2 | Engine 3A | Engine 3B | Engine 4 | Engine 5 | Engine 6A | Engine 6B |
|---|---|---|---|---|---|---|---|---|
| $R_1$ | 50mm | 50mm | 50mm | 50mm | 50mm | 50mm | 50mm | 50mm |
| $R_2$ | 1.5mm | 0.25mm | 0.25mm | 0.25mm | 0.25mm | 0.25mm | 0.25mm | 0.25mm |
| $R_3$ | 16.73mm | 10mm | 10.4mm | 14.35mm | 11.5mm | 13mm | 15.75mm | 14.5mm |
| $R_4$ | 9mm | 21.62mm | 23mm | NA | 33mm | NA | NA | NA |
| $R_5$ | 5mm | 14.25mm | 15mm | 15mm | 16mm | 15mm | 16mm | 16mm |
| $A_1$ | 128° | 128° | 128° | 124° | 128° | 128° | 128° | 128° |
| $A_2$ | 130° | 130° | 130° | 130° | 130° | 130° | 130° | 130° |
| $A_1 - A_2$ | 2° | 2° | 2° | 6° | 2° | 2° | 2° | 2° |
| $A_3$ | 75.6° | 78.17° | 77.88° | 90° | 76.71° | 90° | 90° | 90° |
| $D_1$ | 57.5mm | 65.0mm | 68.5mm | 68.6mm | 72.5mm | 68.6mm | 72.5mm | 72.5mm |
| $D_2$ | 41.75mm | 44.9mm | 48.3mm | 49.3mm | 53.8mm | 46.8mm | 52.0mm | 52.8mm |
| $D_3$ | 1.0mm | NA | NA | NA | NA | NA | NA | NA |
| $D_4$ | 1.0mm | 1.9mm | 2mm | 2mm | 2.15mm | 2mm | 2.15mm | 2.15mm |
| $D_5$ | 3.2mm | 4.1mm | 4.1mm | 4.1mm | 4.1mm | 4.1mm | 4.1mm | 4.1mm |
| $D_6$ | 83.5mm | 89.75mm | 96.5mm | 98.5mm | 107.5mm | 93.5mm | 104mm | 105.5mm |
| $D_7$ | 67.09mm | 70.74mm | 76.85mm | 69.8mm | 86.13mm | 67.5mm | 72.5mm | 72.5mm |
| $D_8$ | 10.08mm | 13.65mm | 14mm | 14mm | 14.5mm | 14.0mm | 14.5mm | 14.5mm |
| $D_9$ | 3mm | 3.25mm | 3.6mm | 4.415mm | 4.3mm | 4.4mm | 2.5mm | 4.8mm |
| $D_{10}$ | (1.5mm) | (5.9mm) | (6.3mm) | 4.415mm | 6.94mm | 4.4mm | 2.5mm | 4.8mm |
| Bowl to Bore Ratio | 0.743 | 0.690 | 0.703 | 0.718 | 0.741 | 0.682 | 0.717 | 0.728 |
| No. of Injector Orifices | 5 | 5 | 5 | 5 | 5 | 6 | 6 | 6 |
| Bowl Volume | 71.74cm³ | 86.5cm³ | 106.13cm³ | 116cm³ | 146.72cm³ | 97.52cm³ | 124.16cm³ | 136.66cm³ |
| Compression Ratio | 17.0:1 | 17:1 | 17:1 | 16:1 | 16:1 | 16:1 | 16:1 | 15:1 |
| Reentrant | Y | Y | Y | N | Y | N | N | N |

Figure 4

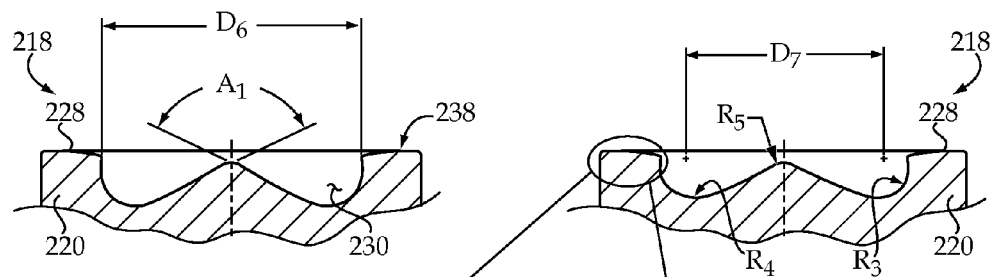
Figure 7a        Figure 7b
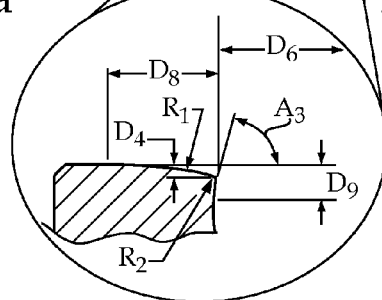
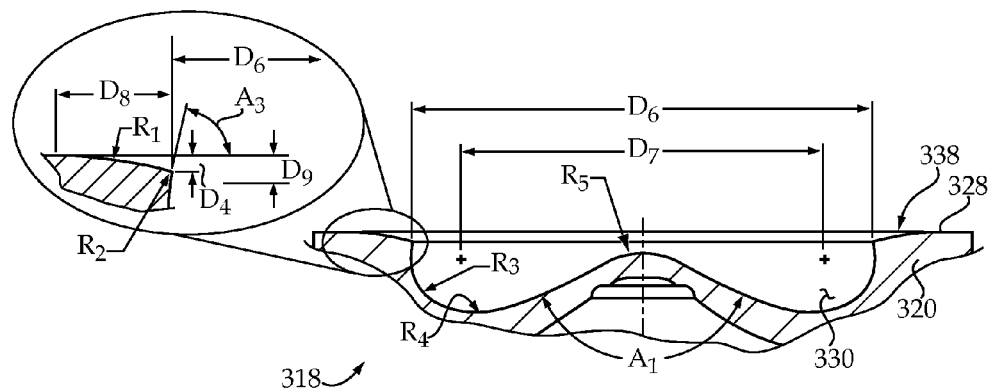
Figure 8

PISTON HAVING COMBUSTION BOWL SHAPED TO BALANCE COMBUSTION EFFICIENCY AND EMISSION PROPERTIES

CROSS REFERENCE TO RELATED APPLICATIONS

This application claims the benefit of the filing date of U.S. Provisional Patent Application Ser. No. 61/326,161, filed Apr. 20, 2010.

TECHNICAL FIELD

The present disclosure relates generally to pistons of the type used in compression ignition internal combustion engines, and relates more particularly to a piston combustion face having a radiused inner rim surface, and an abrupt transition between the radiused inner rim surface and a combustion bowl.

BACKGROUND

A wide variety of operating strategies, and component geometries are known in the field of internal combustion engines. Engineers have experimented for decades with different ways to operate fueling, exhaust, intake, and other engine systems, and different ways to shape and proportion engine components. One motivation behind such experimentation has been balancing the often competing concerns of reducing certain emissions in the engine exhaust, and optimizing efficiency. Internal combustion engines typically burn air and a hydrocarbon fuel. Combustion of the fuel and air produces exhaust from the internal combustion engine, which can include a variety of compounds and materials such as soot, ash, unburned hydrocarbons, water, carbon dioxide, carbon monoxide, and various other organic and inorganic species.

In recent years, the reduction in emissions of oxides of nitrogen, collectively referred to as "NOx", and the reduction of particulate matter which generally includes soot and ash, has been of particular focus in internal combustion engine research. Unfortunately, reducing these undesirable exhaust constituents often comes at the expense of efficiency properties such as fuel efficiency and/or attainable engine speed or power. As noted above, component shapes and operating parameters of the engine have been varied in almost innumerable ways over the years. One area of particular focus has involved attempts to shape a piston combustion face in such a way that certain exhaust emissions are reduced, without sacrificing efficiency.

One common piston design directed to reducing emissions without sacrificing efficiency unduly, includes a combustion bowl defined by the combustion face of the piston which is exposed to and defines a portion of the engine combustion chamber. It is believed that a combustion bowl may affect the flow and combustion properties of gases and atomized liquid fuel during a combustion event in such a way that the make-up of the combustion products can be tailored for various purposes. As mentioned above, it is often desirable to reduce NOx and particulate matter without unduly affecting combustion efficiency.

Currently, despite the development of numerous research and commercial designs for piston combustion bowls, the science of combustion as it relates to bowl shape or combinations of shapes during a combustion event is not fully understood. It is well known that even relatively minor modifications to combustion bowl geometry can have significant effects on the type and relative proportions of combustion products. Due to this lack of sufficient understanding, the art provides relatively little guidance on how to achieve any specific set of goals. Engineers have discovered many different variables which they know will have some effect on emissions and/or efficiency, but the grouping of these variables and other factors do not often result in satisfactory and predictable results. Developing a suitable design often requires years of research and development including thorough application, testing and field analysis.

SUMMARY OF THE DISCLOSURE

In one aspect, a piston for a compression ignition internal combustion engine includes a piston body have an outer cylindrical surface defining a longitudinal piston axis. The piston body further includes a first axial piston end, and a second axial piston end having a combustion face defining a combustion bowl. The combustion face includes a compound bowl surface having an inner bowl surface and an outer bowl surface, and a compound rim surface having an outer rim surface adjoining the outer cylindrical surface and an inner rim surface adjoining the compound bowl surface. The combustion face further includes a cross sectional profile which includes a profile of rotation about the longitudinal axis, the profile of rotation being shaped to balance a combustion efficiency property of the piston with a NOx generation property and a smoke generation property of the piston. The profile of rotation includes a compound bowl profile defining a convex curve segment corresponding to the inner bowl surface and being bisected by the longitudinal axis, and further defining a plurality of concave curve segments outboard of the convex curve segment and corresponding to the outer bowl surface. The convex curve segment defines a relatively small radius of curvature and the concave curve segments each define a medium radius of curvature. The profile of rotation further includes a compound rim profile defining a plurality of linear curve segments corresponding to the outer rim surface, and further defining a plurality of convex curve segments corresponding to the inner rim surface and each adjoining one of the linear curve segments. The plurality of convex curve segments each define a relatively large radius of curvature. The combustion face further includes a first continuous transition from the inner bowl surface to the outer bowl surface, a second continuous transition from the inner rim surface to the outer rim surface, and an abrupt transition from the compound bowl surface to the compound rim surface.

In another aspect, a piston is provided, for balancing combustion efficiency with NOx generation and smoke generation in a direct injection compression ignition internal combustion engine having a compression ratio from 15:1 to 17:1, where the engine has a swirl ration of 1 or less, a combustion bowl diameter to cylinder bore diameter ratio from 0.68 to 0.74, and where a fuel injection spray angle is larger than a cone angle defined by a conical projection of the piston within the combustion bowl. The piston includes a piston body having an outer cylindrical surface defining a longitudinal piston axis, an axial piston end which includes a combustion face defining a compound combustion bowl, and a compound rim located on the axial piston end and extending radially outwardly from the combustion bowl to the outer cylindrical surface. The compound combustion bowl includes a convex inner bowl surface located on the conical projection, and a concave outer bowl surface, and the compound rim includes a flat outer rim surface adjoining the outer cylindrical surface and a convex inner rim surface adjoining the compound combustion bowl. The cone angle is equal to about 135° or less, the concave outer bowl surface defines a first radius of curvature which is from 7 mm to 20 mm, and the convex inner bowl surface continuously transitions with the concave outer bowl surface. The convex inner rim surface abruptly transitions with the concave outer bowl surface at an edge of the compound combustion bowl, and the convex inner rim surface defines a second radius of curvature which is from 40 mm to 70 mm, whereby the bowl rim is axially recessed from a plane defined by the flat outer rim surface such that gases are squished from a crevice having an outwardly narrowing taper and being defined in part by the cylinder head and in part by the compound rim when the piston is at a top dead center position in the engine.

In another aspect, a method of operating a compression ignition internal combustion engine includes conveying air into a cylinder of the engine such that the air swirls about the cylinder, and advancing a piston having a compound combustion bowl toward a top dead center position in the cylinder. A ratio of a diameter of the combustion bowl to a diameter of the cylinder is from 0.68 to 0.74, and the combustion bowl includes a convex inner bowl surface continuously transitioning with a concave outer bowl surface defining a first radius of curvature from 7 mm to 20 mm. The method further includes, during the step of advancing, squishing gases from a crevice defined in part by a cylinder head of the engine and in part by a compound rim of the piston, the compound rim having a flat outer rim surface and a convex inner rim surface defining a second radius of curvature which is from 40 mm to 70 mm. The method still further includes conveying the squished gases past an abrupt transition between the compound rim and the compound combustion bowl, and injecting a fuel directly into the cylinder such that the air and fuel autoignite therein.

In still another aspect, a direct injection compression ignition internal combustion engine includes an engine housing defining a cylinder bore, and including an intake passage and an exhaust passage each being in fluid communication with the cylinder bore, and a cylinder head coupled with the engine housing. A fuel injector is mounted in the cylinder head and configured to directly inject a fuel into the cylinder, the fuel injector having a plurality of spray orifices defining a spray angle. The engine further includes a piston for balancing combustion efficiency with NOx generation and smoke generation during combusting the fuel and air in the cylinder. The piston includes a piston body having an outer cylindrical surface defining a longitudinal piston axis, and an axial piston end which includes a combustion face defining a compound combustion bowl, where a ratio of a diameter of the combustion bowl to a diameter of the cylinder bore is from 0.68 to 0.74. The piston further includes a conical projection within the combustion bowl, and a compound rim extending in a radially outward direction from the combustion bowl to the outer cylindrical surface. The combustion bowl includes a convex inner bowl surface located on the conical projection, and a concave outer bowl surface, and the compound rim includes a flat outer rim surface adjoining the outer cylindrical surface and a convex inner rim surface adjoining the combustion bowl. The conical projection defines a cone angle which is smaller than the spray angle and is equal to about 135° or less, the concave outer bowl surface defines a first radius of curvature from 7 mm to 20 mm, and the convex inner bowl surface continuously transitions with the concave outer bowl surface. The convex inner rim surface abruptly transitions with the concave outer bowl surface at an edge of the combustion bowl, and the convex inner rim surface defines a second radius of curvature which is from 40 mm to 70 mm, such that a crevice having a narrowing taper in the radially outward direction is defined in part by the cylinder head and in part by the compound rim when the piston is at a top dead center position.

BRIEF DESCRIPTION OF THE DRAWINGS

FIG. 4 is a chart showing certain geometric parameters of compression ignition internal combustion engines according to the present disclosure;

FIG. 7a is a sectioned side diagrammatic view of a portion of a piston according to one embodiment;

FIG. 7b is a sectioned side diagrammatic view similar to FIG. 7a, indicating additional geometric attributes, and including a detailed enlargement;

FIG. 8 is a sectioned side diagrammatic view of a portion of a piston according to one embodiment, and including a detailed enlargement;

DETAILED DESCRIPTION

Figure 1:
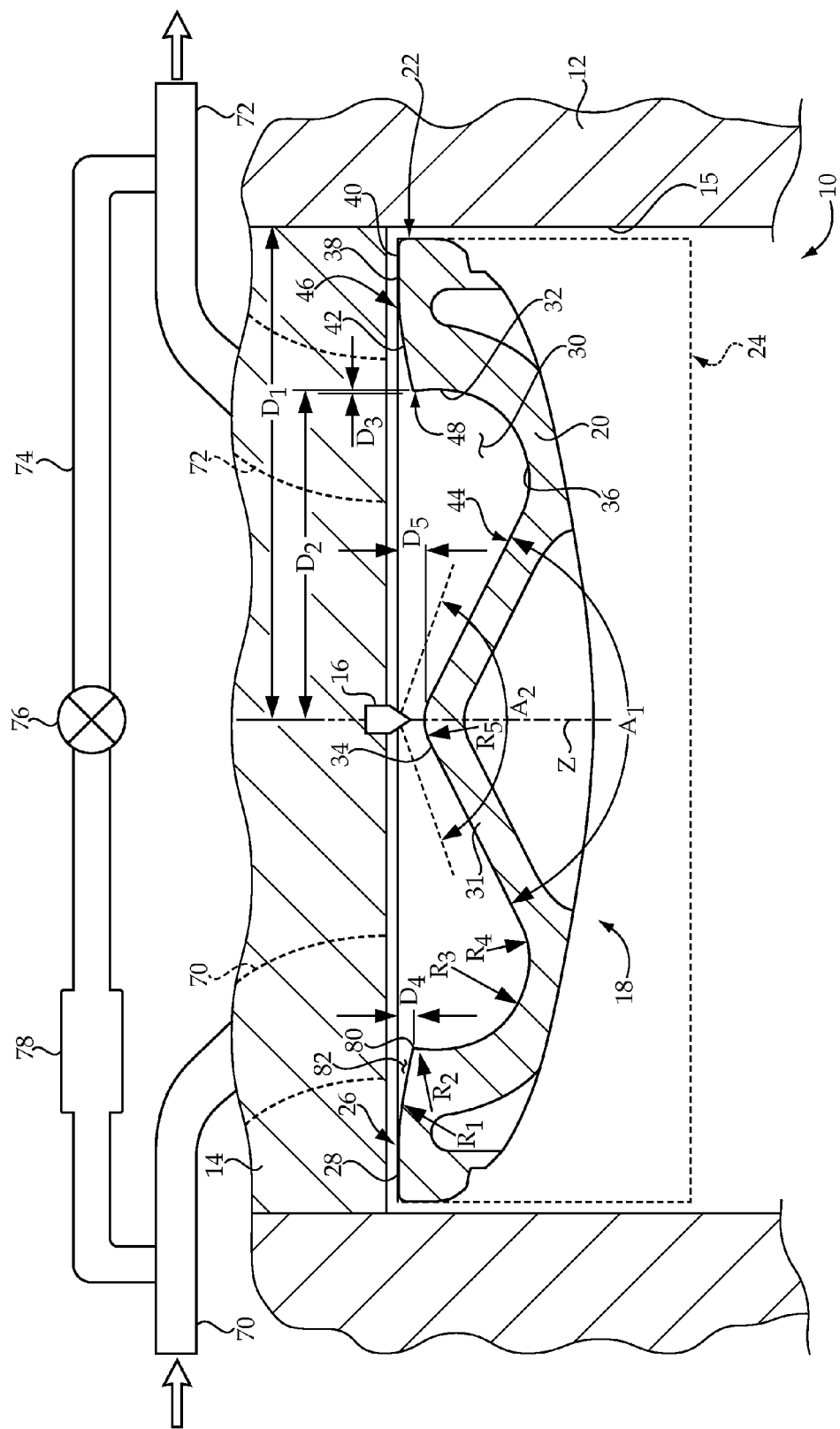
FIG. 1 is a sectioned side diagrammatic view of a compression ignition internal combustion engine, having a piston according to one embodiment.

Referring to FIG. 1, there is shown an engine 10 according to one embodiment. Engine 10 may include a direct injection compression ignition internal combustion engine such as a diesel engine. Engine 10 may further include an engine housing 12 or engine block, a cylinder head 14 coupled with engine housing 12 and a piston 18 positioned to reciprocate within a cylinder 15 defined by engine housing 12. An intake passage 70 is in fluid communication with, and configured to supply air to, cylinder 15, and an exhaust passage 72 is also in fluid communication with, and conveys combustion products out of, cylinder 15. Intake valves and exhaust valves are not shown in FIG. 1, but will typically be provided in a conventional manner. An exhaust gas recirculation loop 74 may connect passages 70 and 74, and having an exhaust recirculation control valve 76 and an exhaust gas cooler 78 positioned therein. As will be further apparent from the following description, piston 18 may be uniquely configured to balance a combustion efficiency property associated with piston 18 with an emissions property associated with piston 18. In particular, piston 18 may include a number of dimensional, proportional, and shape attributes allowing engine 10 to generate relatively low levels of NOx and relatively low levels of particulate matter during operation. Those skilled in the art will appreciate that internal combustion engines, and in particular diesel engines, may generate a variety of types of particulate matter during operation. Such particulate matter is generically referred to herein as "smoke," but the term is not used herein in any limiting sense.

Piston 18 may include a piston body 20 including an outer cylindrical surface 22 which is positioned in opposition to a cylinder wall of cylinder 15 in a conventional manner. Those skilled in the art will readily understand that outer surface 22 may not be uniformly cylindrical for a length of piston body 20, but will typically include a cylindrical surface extending along at least a portion of the axial length which defines a longitudinal piston axis Z. Piston body 20 may further include a first axial piston end 24, and a second axial piston end 26 which includes a combustion face 28 defining a compound combustion bowl 30. Whether a combustion face defines a "compound" combustion bowl as contemplated herein can be determined on the basis of properties such as concavity versus convexity, presence of multiple different surfaces each defining a different radius, flatness versus non-flatness. Thus, a combustion bowl defined by a portion of a combustion face having a cross sectional shape which is a uniform circular arc would not be fairly said to include more than one surface, or define more than one radius of curvature, or have both convexity and concavity, and thus likely not be fairly said to be compound. A combustion bowl defined by a convex portion of a combustion face and a concave portion of a combustion face would likely be fairly said to be compound. A combustion bowl having two concave surfaces, each defining different radiuses of curvature would also likely be fairly said to be compound. Other uses of the term "compound" herein should be analogously construed. Combustion face 28 may include a compound bowl surface 32 having an inner bowl surface 34 and an outer bowl surface 36. Inner bowl surface 32 may be located on a conical projection 31. Combustion face 28 may further include a compound rim surface 38 having an outer rim surface 40 adjoining outer cylindrical surface 22 and an inner rim surface 42 adjoining compound bowl surface 32. Each of outer rim surface 40 and inner rim surface 42 may include an annular surface centered about longitudinal axis Z, and may include other specialized features as further described herein.

Combustion face 28 may further include a first continuous transition 44 from inner bowl surface 34 to outer bowl surface 36, and a second continuous transition 46 from inner rim surface 42 to outer rim surface 40. Combustion face 28 may still further include an abrupt transition 48 from compound bowl surface 32 to compound rim surface 38. FIG. 1 illustrates transitions 44, 46, and 48 in two dimensions, however, those skilled in the art will appreciate that each of transitions 44, 46, and 48 may include an annular transition. Transitions 44, 46, and 48 may each include a plurality of surface points of the two respectively adjoining surfaces. Thus, transition 44 includes a plurality of surface points of inner bowl surface 34 and a plurality of surface points of outer bowl surface 36. Transitions 46 and 48 may be similarly understood. Each of transitions 44, 46, and 48 may be centered on longitudinal axis Z.

Figure 2:
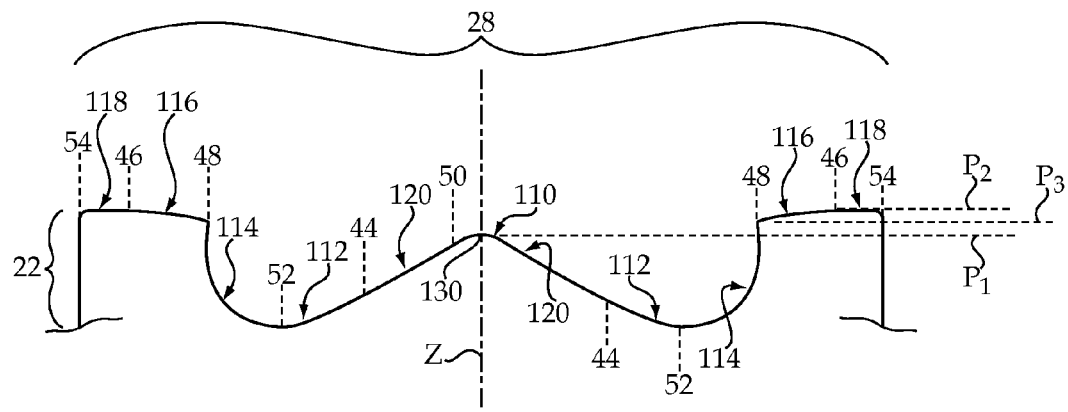
FIG. 2 is a side diagrammatic view of a profile defined by outer surfaces of the piston of FIG. 1.

Referring also now to FIG. 2, combustion face 28 may include a cross sectional profile which includes a profile of rotation about longitudinal axis Z. The profile of rotation may be shaped to balance a combustion efficiency property of piston 18 with a NOx generation property and a smoke generation property of piston 18. The profile of rotation may define a curve in a section plane through piston body 20 which includes a plane of longitudinal axis Z. The curve defined by the profile of rotation may be radially uniform about longitudinal axis Z, and thus would have an identical appearance regardless of what radial orientation is chosen for the subject section plane.

The curve defined by the profile of rotation may include a plurality of different curve segments, each corresponding to one of the surfaces of combustion face 28. As noted above, combustion face 28 may include transitions 44, 46, and 48. Combustion face 28 may also include a fourth transition 52 which includes another continuous transition, and a fifth transition 54 which includes a transition from compound rim surface 38 to outer cylindrical surface 22. Fifth transition 54 may include a continuous transition in one embodiment such as a radiused transition, but could also include a discontinuous transition such as a chamfered transition, or a combination of chamfers and radiuses.

As mentioned above, the profile of rotation may be radially uniform about longitudinal axis Z. Accordingly, the present description of certain features of the profile of rotation on one side of longitudinal axis Z in the illustrations of FIG. 1 and FIG. 2 should be understood to refer similarly to features of the profile of rotation on an opposite side of axis Z in the FIG. 1 and FIG. 2 illustrations. The profile of rotation may include a compound bowl profile defining a convex curve segment bisected by longitudinal axis Z. The convex curve segment may correspond to and be defined by inner bowl surface 34. The convex curve segment defined by the compound bowl profile is denoted with reference numeral 110 in FIG. 2. The compound bowl profile may further define a plurality of concave curve segments outboard of convex curve segment 110, corresponding to and defined by outer bowl surface 36. The plurality of concave curve segments may include a first plurality of concave curve segments 112 and a second plurality of concave curve segments 114. The compound bowl profile may still further include a plurality of linear curve segments 120 adjoining convex curve segment 110, and adjoining concave curve segment 112. Concave curve segments 112 may in turn adjoin concave curve segments 114. The profile of rotation may further include a compound rim profile defining a plurality of linear curve segments 118 corresponding to and defined by outer rim surface 40. The compound rim profile may further define a plurality of convex curve segments 116 corresponding to and defined by inner rim surface 42 and each adjoining one of linear curve segments 118.

In one embodiment, inner bowl surface 34 may include a conical projection surface located on conical projection 31 and defining convex curve segment 110, and having a peak point 130 which is within longitudinal axis Z. Peak point 130 may be positioned at a first axial location which is depicted in FIG. 2 via a first plane $P_1$ which includes peak point 130 and is oriented normal to longitudinal axis Z. Outer rim surface 40 may include a planar surface, and may define a rim plane $P_2$ which is parallel to plane $P_1$, and positioned at a second axial location. Abrupt transition 48 may include an annular edge, further described herein, comprising an edge 80 of combustion bowl 30 which defines a third plane $P_3$ positioned at a third axial location which is axially between the first axial location of plane $P_1$ and the second axial location of plane $P_2$. As such, bowl edge 80 is axially recessed from rim plane $P_2$.

As alluded to above, the profile of rotation may be shaped to balance combustion efficiency with generation of certain emissions. One aspect of the shape of the profile of rotation which addresses these interests is the relative size of radiuses of curvature defined by certain of the surfaces of combustion face 28. To this end, in certain embodiments convex curve segment 110 may define a relatively small radius of curvature shown as radius $R_5$ in FIG. 1. Concave curve segments 114, concave curve segments 112, or both, may define medium radiuses of curvature. The medium radius of curvature defined by concave curve segments 112 is denoted as $R_4$ in FIG. 1, and the medium radius of curvature defined by concave curve segment 114 is denoted as $R_3$ in FIG. 1. In the illustrated embodiment, outer bowl surface 36 defines a plurality of different radiuses of curvature, $R_4$ and $R_3$. Outer bowl surface 36 might define a greater number of radiuses of curvature, or only one radius of curvature, as in certain embodiments shown in the attached drawings. Furthermore, radiuses of curvature defined by outer bowl surface 36 might include one or more radiuses of curvature which are actually smaller than radius $R_5$. In the embodiment of FIG. 1 outer bowl surface 36 will typically include at least one radius of curvature which is larger than radius $R_5$ and thus including a medium radius of curvature. Convex curve segments 116 may each define a relatively large radius of curvature relative to radius $R_5$ and also large relative to at least one of radiuses $R_3$ and $R_4$.

Figure 3:
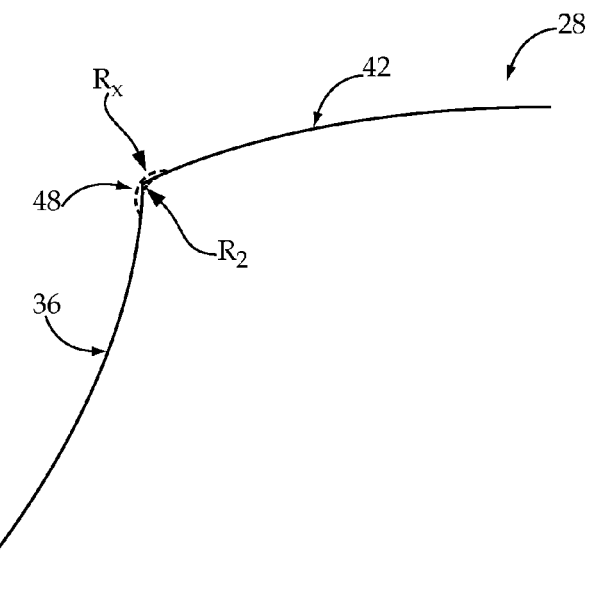
FIG. 3 is a detailed diagrammatic view of a portion of the profile shown in FIG. 2.

Referring also to FIG. 3, there is shown a detailed view of a portion of a profile of combustion face 28, and in particular including portions of inner rim surface 42 and outer bowl surface 36 adjoining at transition 48. As discussed above, transition 48 may include an abrupt transition. In one embodiment, abrupt transition 48 may include an annular edge comprising bowl edge 80. The annular edge may include an annular re-entrant protrusion. This is the configuration shown in FIGS. 1, 2 and 3. In other embodiments, also shown in the attached drawings, abrupt transition 48 may not include a re-entrant protrusion and instead a straight-sided bowl may be used. A re-entrant bowl configuration has been discovered to be advantageous for pistons used in certain engines having a relatively low speed and relatively lower horsepower duty cycle. In higher speed and higher horsepower applications a re-entrant bowl configuration has been found to be unnecessary to obtain a desired balance between combustion efficiency and emissions. Jurisdictional regulations may also influence whether a re-entrant bowl is needed, as specific emissions and/or efficiency requirements may vary based on engine size or application.

The term "abrupt" used with reference to transition 48 means that the respective surfaces of combustion face 28 adjoining one another at transition 48 are not continuous, or are very close to being not continuous. A "continuous" transition means that the surfaces of combustion face 28 adjoining one another at the transition smoothly intersect one another. A continuous transition would readily be amenable to determining a slope defined by a first point within a surface adjoining one side of the transition and a second point within a surface adjoining a second side of the transition. An "abrupt" transition might include a corner and not be readily amenable to slope determination in this manner. A transition as described herein may also be determined to be abrupt by determining what radius, if any, is defined by a plurality of points within the portions of combustion face 28 meeting at the respective transition. In one embodiment, abrupt transition 48 may include a plurality of surface points of combustion face 28 defining a third convex radius of curvature. In FIG. 1, the third convex radius of curvature is denoted via $R_2$. Radius $R_2$ is also shown in FIG. 3, and corresponds to a tiny radius, for example of about 1.5 millimeters or less, which would be defined by abrupt transition 48 in a non-re-entrant bowl configuration. The phantom line approximately at the tip of the arrow for reference numeral $R_2$ shows a profile of a non-re-entrant bowl, whereas the solid line shows a profile of a re-entrant bowl. This phantom line thus illustrates a surface which would define the tiny radius $R_2$ in a non-re-entrant bowl configuration. Yet another radius $R_x$ is shown in FIG. 3, and corresponds to a tiny radius which may be defined by abrupt transition 48 in the re-entrant combustion bowl configuration. In one embodiment, a re-entrant combustion bowl embodiment, abrupt transition 48 may include a de-burred transition. Those skilled in the art will appreciate that while virtually any edge may be understood microscopically to define a radius, a de-burred edge may in some contexts be understood to define an essentially negligible radius, if at all. Thus, radius $R_x$ or $R_2$ might be defined by connecting a plurality of surface points of combustion face 28 by the shortest possible circular segment which is inclusive of a line separating the adjoining surfaces approximately as shown in FIG. 3. The phantom line approximately at the tip of the arrow for reference letter $R_x$ is such a circular segment, and intersects an imaginary line separating surfaces 42 and 36 which passes in and out of the page in FIG. 3. $R_x$ is the tiny radius defined by this phantom line. An "abrupt" transition may also be understood as the sharpest transition within the combustion face. The third convex radius of curvature $R_2/R_x$ defined by the surface points of combustion face 28 within abrupt transition 48 may also be less than the relatively small radius of curvature $R_5$, and may also be at least an order of magnitude less than the relatively large radius of curvature $R_1$. In one particular embodiment, radius $R_1$ may be equal to about 50 millimeters.

Referring also to FIG. 4, there is shown a chart listing various features associated with internal combustion engines and pistons according to the present disclosure. Certain features of piston 18 and certain features of engine 10, as well as other engines contemplated herein, may relate to one another in a manner considered advantageous in achieving the goals described herein of balancing combustion efficiency properties with emissions generation properties. It will be recalled that inner bowl surface 34 may include a conical projection surface on conical projection 31. The conical projection surface may define a cone angle of combustion bowl 30. Cone angle is shown in FIG. 1 via reference letter $A_1$. In practical implementation strategies, cone angle $A_1$ may be equal to about 135° or less, and may be between about 125° and 135°. In certain embodiments, a smaller cone angle between about 124° and about 128° may be appropriate, however. Suitability of a particular cone angle may depend in part upon a fuel injector spray angle used, and a desired pattern of fuel spray plume travel within cylinder 15, as further described herein. Engine 10 also includes a fuel injector 16 mounted in cylinder head 14, having a plurality of injector orifices (not shown). The injector orifices may have a total number of 5 or 6, for example, and define an injector spray angle which may be equal to about 130°. Injector spray angle is shown via reference letter $A_2$ in FIG. 1. In certain embodiments, the cone angle $A_1$ will be less than the spray angle $A_2$.

The difference between injector spray angle $A_2$ and cone angle $A_1$ may be between about 2° and about 6° in certain embodiments. An axial distance between the third axial location of plane $P_3$ and the second axial location of plane $P_2$ may define a bowl rim depth denoted via $D_4$ in FIG. 1 which is less than a cone depth $D_5$ defined by a difference between axial locations of planes $P_1$ and $P_2$. In one further embodiment cone depth $D_5$ may be equal to about 3 mm or greater, and may be between about 3 mm and about 6 mm. For a piston used in Engine 1, cone depth may be equal to about 3.2 mm. Rim depth $D_4$ may be equal to between about 1 mm and about 3 mm.

As used herein, the term "about" may be understood in the context of a number of significant digits. Thus, where relatively large radius of curvature $R_1$ is described as equal to about 50 mm, it may be understood to be equal to between 45 mm and 54 mm. Further dimensional features of example pistons and engines according to the present disclosure, and example relationships between and among the features may be obtained from a study of the chart shown in FIG. 4. As mentioned above, the chart shown in FIG. 4 includes example dimensions and proportional relationships for a plurality of different engines according to the present disclosure. The chart illustrates parameters for a first engine, Engine number 1, which includes an example C9 engine manufactured by the Assignee of the present patent application. Engine 2 represents one example C13 engine manufactured by the Assignee of the present patent application. Engines 3A and 3B include C15 engines, Engine 4 includes a C18 engine, Engine 5 includes a C27 engine, and engines 6A and 6B each include C32 engines, all of which are manufactured by the Assignee of the present patent application.

The dimensions shown in the chart of FIG. 4 represent practical implementation strategies, and specific examples of working embodiments. The following table defines parameters discussed herein and lists ranges for certain of the parameters listed in the chart of FIG. 4 and illustrated in the attached drawings.

TABLE 1

| Symbol | Parameter | Range |
|---|---|---|
| $R_1$ | Top Land Radius | 40 mm-70 mm |
| $R_2$ | Bowl Rim Radius | ∠3 mm |
| $R_3$ | Bowl Radius and Location | 7 mm-20 mm |
| $R_4$ | Bowl Radius and Location | 7 mm-20 mm |
| $R_5$ | Cone Radius | 5 mm-16 mm |
| $D_1$ | Cylinder Bore Radius | 57 mm-73 mm |
| $D_2$ | Bowl Radius | 32 mm-54 mm (68%-75% of bore radius) |
| $D_3$ | Re-entrant Protrusion | 0 mm-2 mm |
| $D_4$ | Bowl Rim Depth | 1 mm-3 mm |
| $D_5$ | Cone Depth | 3 mm-6 mm |
| $D_6$ | Bowl Diameter | 64 mm-108 mm |
| $D_7$ | Distance Between Centers of Circles Defined By $R_3$ | 60 mm-90 mm |
| $D_8$ | Convex Rim Surface Diameter | 10 mm-18 mm |
| $D_9$ | Distance From Rim Plane To Base of Re-entrant Protrusion | 3 mm-5 mm |
| $D_{10}$ | Distance From Rim to Centers of Circles Defined by R3 (parentheses used where centers are above Rim Plane) | (7 mm)-7 mm |
| $A_1$ | Cone Angle | 125°-135° |
| $A_2$ | Injector Spray Angle | >$A_1$ |
| $A_3$ | Bowl Re-entrancy Angle | 75°-77° |

Figure 9:
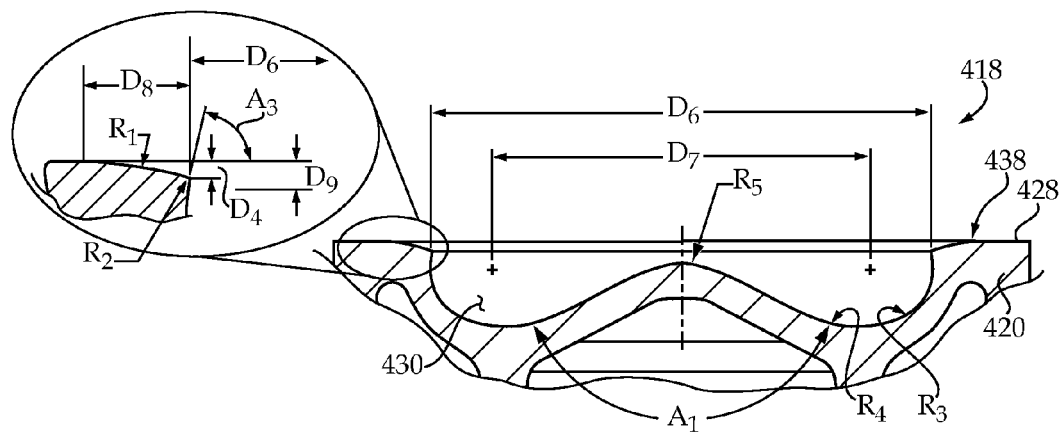
FIG. 9 is a sectioned side diagrammatic view of a portion of a piston according to one embodiment, and including a detailed enlargement.
Figure 10:
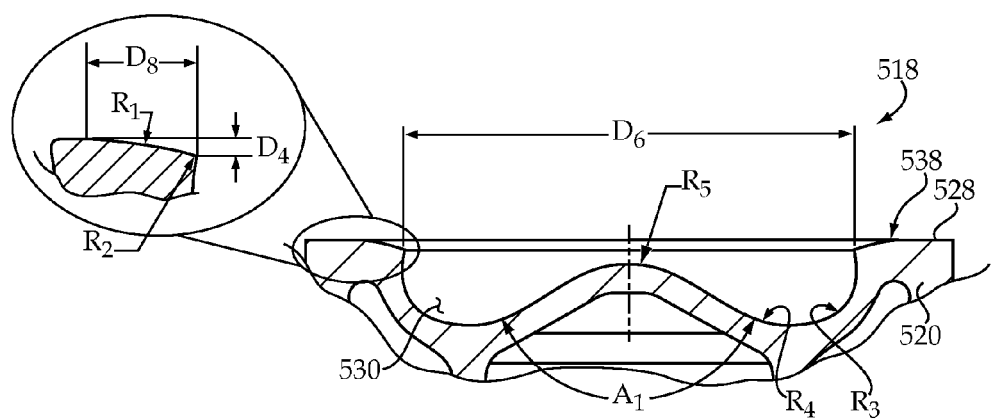
FIG. 10 is a sectioned side diagrammatic view of a portion of a piston according to one embodiment, and including a detailed enlargement.
Figure 11:
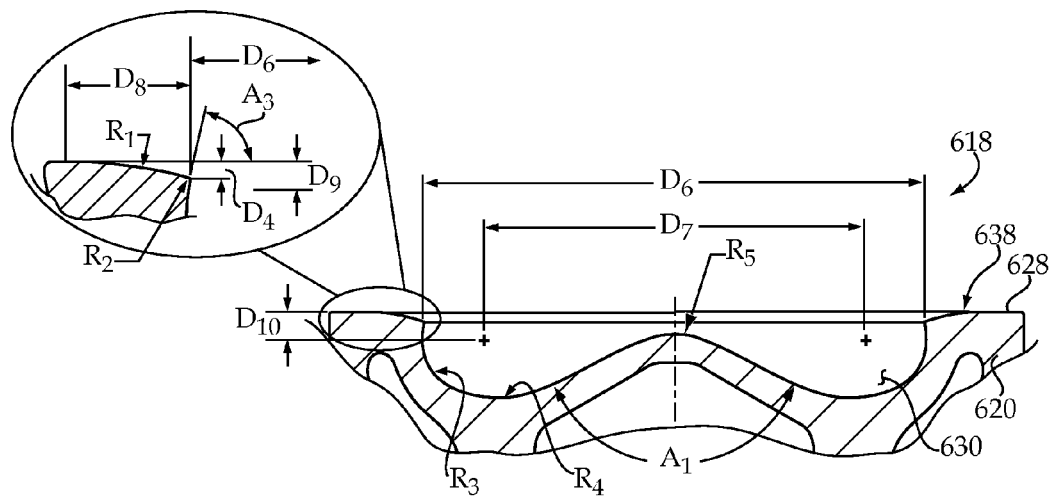
FIG. 11 is a sectioned side diagrammatic view of a portion of a piston according to one embodiment, and including a detailed enlargement.
Figure 12:
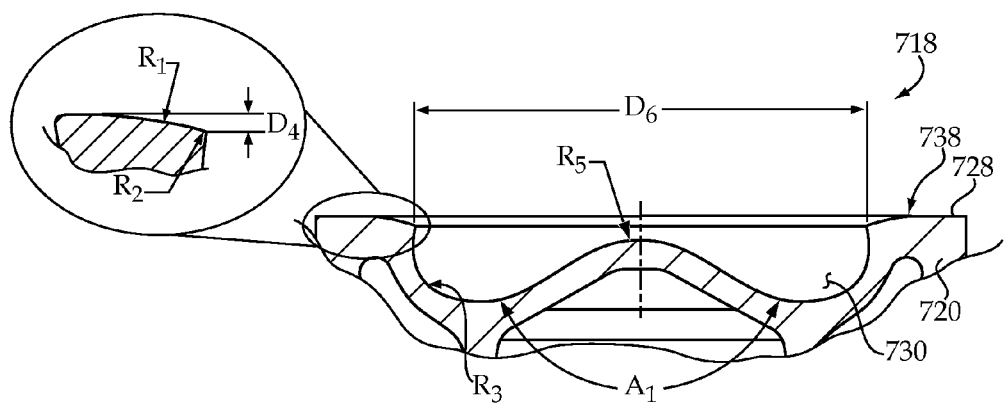
FIG. 12 is a sectioned side diagrammatic view of a portion of a piston according to one embodiment, and including a detailed enlargement.
Figure 13:
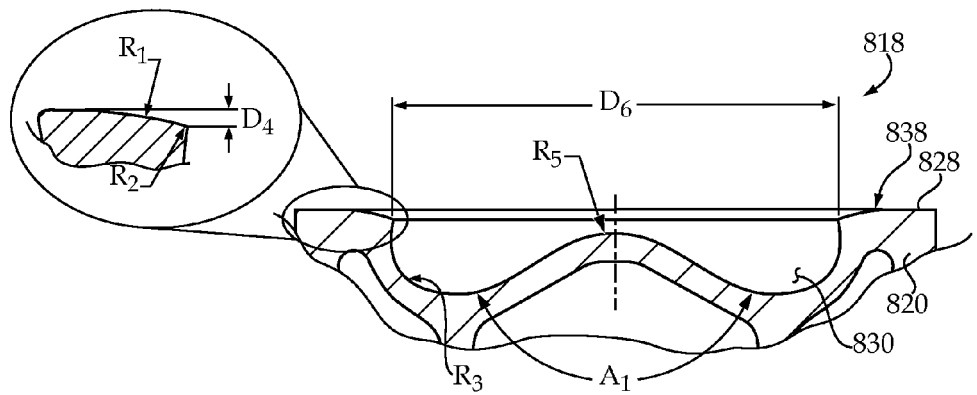
FIG. 13 is a sectioned side diagrammatic view of a portion of a piston according to one embodiment, and including a detailed enlargement.
Figure 14:
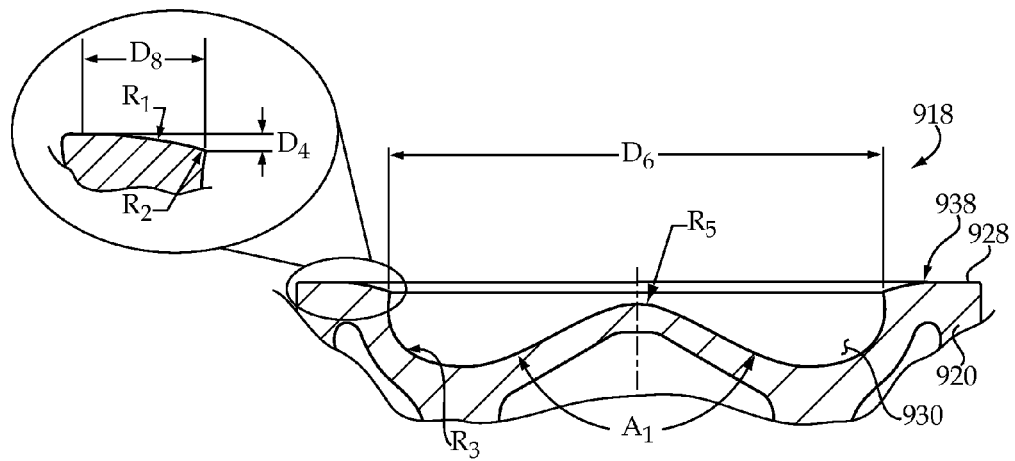
FIG. 14 is a sectioned side diagrammatic view of a portion of a piston according to one embodiment, and including a detailed enlargement.

FIGS. 7a-14 each illustrate features of example pistons according to the present disclosure. FIGS. 7a and 7b correspond to Engine 1 in the chart of FIG. 4, whereas FIG. 8 corresponds to Engine 2. FIG. 9 corresponds to Engine 3a, whereas FIG. 10 corresponds to Engine 3b. FIG. 11 corresponds to Engine 4, FIG. 12 corresponds to Engine 5, FIG. 13 corresponds to Engine 6a, and FIG. 14 corresponds to Engine 6b. Reference letters used in FIGS. 7a-14 identify features analogous to those identified by the same reference letters in FIG. 1. Thus, $R_1$ identifies the top land radius in each of the pistons of FIGS. 7a-14, $R_3$ identifies the bowl radius, and so on. Reference numerals used in FIGS. 7a-14 are used to identify features analogous to those identified by reference numerals in FIG. 1 which differ by one digit. Thus, 18 identifies the piston in the embodiment of FIG. 1, 218 identifies the piston in FIGS. 7a and 7b, 318 identifies the piston in FIG. 8, and so on.

INDUSTRIAL APPLICABILITY

Returning to FIG. 1, engine 10 is shown with piston 18 positioned as it might appear having been advanced to a top dead center position in cylinder 15 at the end of a compression stroke. Air has been conveyed into cylinder 15 such that the air swirls about cylinder 15 in a direction which is circumferential of longitudinal axis Z. In one embodiment, a mixture of gases containing air and recirculated exhaust gases may be conveyed via intake passage 70 into cylinder 15, such that the mixture of gases swirls at a speed which is equal to or less than a speed of rotation of engine 10, in other words having a swirl ratio of about 1 or less. Swirl ratio may be understood herein as the quotient of a tangential velocity of the swirling gases and engine speed (RPM). The mixture of gases within cylinder 15 may be compressed during a compression stroke of piston 18 such that a pressure of the mixture of gases increases by a factor of 15 to 17.

Shortly before piston 18 is advanced to a top dead center position in cylinder 15, fuel injection directly into cylinder 15 may begin. In one embodiment, fuel injection may commence at an engine timing such that a center axis of each of the total of five or six fuel spray plumes from the spray orifices in fuel injector 16 points at abrupt transition 48. By way of illustration, were a snapshot to be taken of piston 18 within cylinder 15 at the time that fuel injection commences, the center axes of the fuel spray plumes could be expected to intersect bowl edge 80. Dashed lines extending outwardly from injector 16 in FIG. 1 illustrate center axes of fuel spray plumes. As noted above, cone angle $A_1$ may be smaller than spray angle $A_2$. It will generally be desirable to direct fuel radially outwardly in combustion bowl 30, such that impingement of fuel spray upon convex inner surface 34 is limited or avoided altogether. The relatively smaller cone angle $A_1$, as well as other features such as bowl shape and volume, injection timing, and spray angle can also further this goal. At or just prior to the time that piston 18 reaches a top dead center position, gases may be squished from a crevice 82 defined in part by cylinder head 14 and in part by compound rim 38, when piston 18 is at the top dead center position. It may be noted that crevice 82 includes a narrowing taper in a radially outward direction. In particular, the gases may be squished inwardly toward and into combustion bowl 30, past abrupt transition 48, and in a manner believed to induce or at least augment swirling of the gases as well as atomized and vaporized fuel. Swirling which results from squishing gases from crevice 82 may occur in a path which roughly follows a profile of combustion bowl 30 and the exposed inner surface of cylinder head 14. Thus, in the part of combustion bowl 30 to the right of axis Z in FIG. 1, the gases may swirl in a counterclockwise direction, and in a clockwise direction on the other side of axis Z. This is distinct from the pattern of swirling associated with conveying the intake gases into cylinder 15, which is circumferential of axis Z. At or shortly after piston 18 reaches a top dead center position, autoignition of the mixture of gases and fuel within cylinder 15 occurs.

Figure 5A:
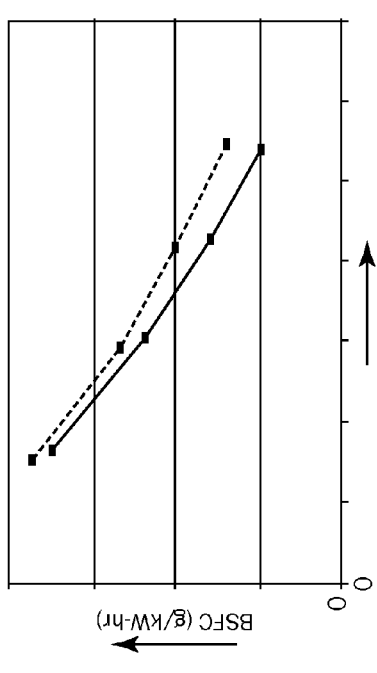
FIG. 5a is a graph illustrating NOx versus AVL smoke trade-off for a chamfered rim piston and a radiused rim piston.
Figure 5B:
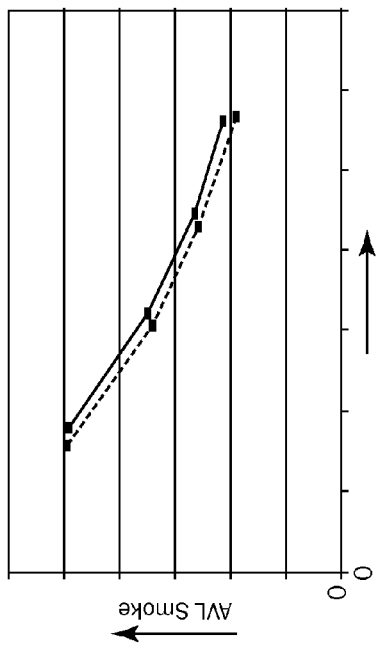
FIG. 5b is a graph illustrating NOx versus BSFC trade-off for a chamfered rim piston and a radiused rim piston.

FIG. 5a includes a graph comparing AVL smoke with NOx for a chamfer rim piston (dashed line) versus a radiused rim piston (solid line) of the type disclosed herein. FIG. 5b includes a graph comparing BSFC (Brake Specific Fuel Consumption) compared with NOx for the same chamfered and radiused rim pistons. The data depicted in FIGS. 5a and 5b were taken on a C15 engine, of a type manufactured by the Assignee of the present patent application, using exhaust gas recirculation. The engine was operated at about 1800 RPM and 1050 Newton meters, an approximately 100% load condition. The different NOx levels were achieved by sweeping exhaust gas recirculation amounts, while keeping start of injection pressure and main injection timing constant. It may be noted from FIGS. 5a and 5b that an engine-out soot rate or smoke, and BSFC, are very similar for a chamfer rim piston versus a radiused rim piston. In FIG. 5a, each of the two curves between their respective terminal ends indicate approximately a twofold total change in measured smoke value, and a two and one half fold change in measured NOx value. In FIG. 5b, the two curves each indicate approximately a twofold change in measured BSFC value, and about a 2%-3% change in measured NOx value. The graphs are illustrative only, and other test conditions could yield different results, however, the conclusions which may be drawn from the graphs of FIGS. 5a and 5b are expected to be at least somewhat generalizable to piston bowl designs independent of certain other geometric factors.

Figure 6A:
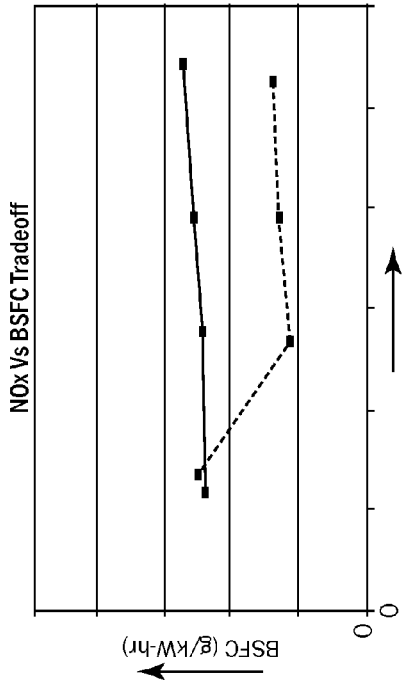
FIG. 6a is a graph illustrating NOx versus AVL smoke trade-off for a straight bowl piston and a re-entrant bowl piston.
Figure 6B:
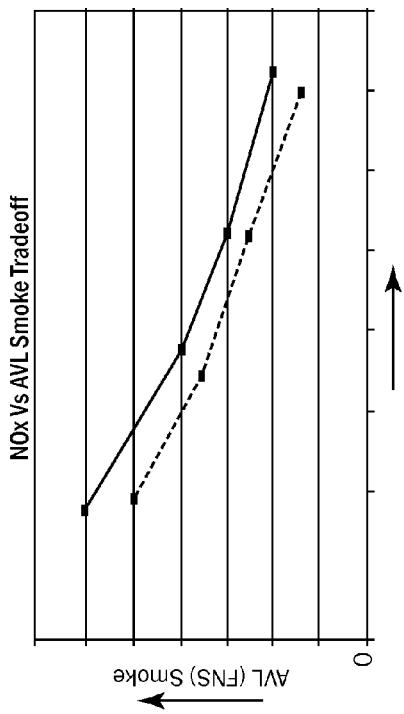
FIG. 6b is a graph illustrating NOx versus BSFC trade-off for a straight bowl piston and a re-entrant bowl piston.

FIGS. 6a and 6b, respectively, include graphs of smoke generation in comparison with NOx generation, and BSFC in comparison with NOx generation, for each of a straight bowl (solid line) and a re-entrant bowl (dashed line) piston design. The data depicted in FIGS. 6a and 6b were acquired on an engine similar to that used in obtaining the data of FIGS. 5a and 5b, and operated under similar conditions. It may be noted that an improvement in smoke on a re-entrant bowl design compared to the straight bowl design is readily apparent, and changes in BSFC are negligible, i.e. within measurement capability. In the graph of FIG. 6b, each curve illustrates a total change in measured smoke value of about twofold, and a total change in measured NOx value of about one and one half fold. In the graph of FIG. 6a, the straight bowl curve shows little total change in measured BSFC value, and the re-entrant bowl curve shows a total BSFC change within measurement capability. Each curve in FIG. 6b shows approximately a twofold change in measured NOx value. The improvement in smoke obtained with the re-entrant bowl design compared to the straight bowl design is equal to at least a 10% improvement in the engine used to obtain the data depicted in FIGS. 6a and 6b, and under the described operating conditions. Like the graphs of FIGS. 5a and 5b, the conclusions to be drawn from FIGS. 6a and 6b are expected to be at least somewhat generalizable.

As discussed above, various geometric features of pistons and compression ignition internal combustion engines, as well as engine operating conditions and strategies, can significantly impact efficiency and emissions. The particular effects of many of these parameters are relatively poorly understood, and the cross coupling of the parameters often means that toggling any individual one can have unpredictable consequences. Compounding these challenges are certain variations in engine design and operation from manufacturer to manufacturer that may not be specifically intended to address efficiency and/or emissions, but which create fixed external restrictions on how any particular engine or piston can be configured, and therefore limit the design options available. For instance, swirl ratio is a factor that may depend at least in part upon geometry of components in the intake system of an engine. Where redesigning the intake system is not a viable option, developing a piston that imparts suitable efficiency and emissions can require engineering a piston that will work within certain immutable constraints imposed by the intake system. Similarly, where exhaust gas recirculation is chosen as a basic NOx reduction strategy, engineering a piston which can give suitable performance in an EGR-based engine may be a different matter than engineering a piston which performs optimally in a system where some other NOx reducing strategy is used. In other words, since it is known that EGR may be associated with a certain balance of NOx and smoke in at least certain implementations, designing a piston which can assist in reducing both NOx and smoke for an EGR-based engine requires striking a different balance than that required for a piston used in a non-EGR engine which otherwise tends to produce a different balance of NOx and smoke. Still other factors such as cylinder bore size and compression ratio can serve as essentially fixed, external constraints.

Accordingly, those skilled in the art will appreciate that developing a piston which imparts acceptable performance in an engine of type "X" may be a very different endeavor than developing a piston suitable for an engine of type "Y." There are nevertheless certain generalizations building upon those set forth above which can guide decision making in developing a piston, engine, or operating method according to the present disclosure. For example, EGR has been found to be effective in many instances at reducing NOx, but in some instances the combustion conditions in an engine using EGR can result in the production of undue amounts of smoke. It has been discovered that forming transition 48 to be relatively more abrupt for higher amounts of EGR and relatively less abrupt for lower or zero amounts of EGR may assist in keeping smoke levels down without a $NO_x$ penalty. With regard to rim geometry, it has been discovered that a flat rim as in certain earlier designs may be associated with relatively higher smoke than that produced using a radiused rim as in the presently disclosed designs. It may be noted from the chart of FIG. 4 that certain of the pistons are designed having re-entrant combustion bowls, whereas the others include straight sided combustion bowls. In some instances, the re-entrant bowl designs may be associated with lower smoke amounts than the straight sided bowl designs. As discussed above, however, engine duty cycle can affect these and other properties. Thus, for an engine expected to operate at higher speeds or loads, the prevailing combustion conditions may be such that acceptable smoke levels are produced regardless of whether a straight sided or re-entrant combustion bowl is used.

In view of the foregoing, it will be appreciated that seemingly minute changes in geometry, particularly at or near the edge of a combustion bowl, can have significant effects on emissions and/or efficiency. Since these properties can also depend in significant part upon how the engine is operated, a piston configured for use in one type of engine having a first duty cycle may not be successful in another type of engine having a different duty cycle. The examples set forth in the chart of FIG. 4 include eight different engines which represent practical implementations of the present disclosure. The different parameters listed in the chart of FIG. 4 may have relatively lower or higher significance respecting balancing of efficiency, NOx and smoke, and the parameters which should be deemed critical may depend upon the particular balance sought.

The present description is for illustrative purposes only, and should not be construed to narrow the breadth of the present disclosure in any way. Thus, those skilled in the art will appreciate the various modification might be made to the presently disclosed embodiments without departing from the full and fair scope and spirit of the present disclosure. Other aspects, features and advantages will be apparent upon an examination of the attached drawings and appended claims.

What is claimed is:

1. A piston for a compression ignition internal combustion engine, the piston comprising:
    a piston body including
        an outer cylindrical surface defining a longitudinal axis,
        a combustion face defining a combustion bowl, the combustion face including a compound bowl surface having an inner bowl surface and an outer bowl surface, and
        a compound rim surface having an outer rim surface adjoining the outer cylindrical surface and an inner rim surface adjoining the compound bowl surface;
    the combustion face further including a profile of rotation about the longitudinal axis, the profile of rotation including a compound bowl profile defining a bowl convex curve segment corresponding to the inner bowl surface and being bisected by the longitudinal axis, and further defining a plurality of concave curve segments outboard of the bowl convex curve segment and corresponding to the outer bowl surface, a radius of curvature of the bowl convex curve segment being smaller than a radius of curvature of the plurality of concave curve segments;
    the profile of rotation further including a compound rim profile defining a plurality of linear curve segments corresponding to the outer rim surface, and further defining a plurality of rim convex curve segments corresponding to the inner rim surface, each convex curve segment of the plurality of rim convex curve segments adjoining one linear curve segment of the plurality of linear curve segments, a radius of curvature of the plurality of rim convex curve segments being larger than the radius of curvature of the plurality of concave curve segments;
    the combustion face further including a first continuous transition from the inner bowl surface to the outer bowl surface, a second continuous transition from the inner rim surface to the outer rim surface, and an abrupt transition from the compound bowl surface to the compound rim surface; and
    the plurality of concave curve segments including a first concave curve segment and a second concave curve segment, a radius of curvature of the first concave curve segment being different from a radius of curvature of the second concave curve segment.

2. The piston of claim 1 wherein the abrupt transition includes a plurality of surface points of the combustion face defining a radius of curvature of the abrupt transition, the radius of curvature of the abrupt transition being less than the radius of curvature of the bowl convex curve segment, and being at least an order of magnitude less than the radius of curvature of the plurality of rim convex curve segments.

3. The piston of claim 2 wherein the first continuous transition includes a linear transition, the second continuous transition includes a radiused transition, and the abrupt transition includes a deburred transition.

4. The piston of claim 2 wherein the inner bowl surface includes a conical projection surface defining, at least in part, the bowl convex curve segment and having a peak point positioned at a first axial location along the longitudinal axis, wherein the outer rim surface defines a rim plane positioned at a second axial location, and wherein the abrupt transition is positioned at a third axial location which is located between the first axial location and the second axial location along the longitudinal axis.

5. The piston of claim 4 wherein the conical projection surface defines a cone angle of the combustion bowl between about 124 degrees and about 128 degrees, wherein an axial distance from the first axial location to the second axial location defines a cone depth, and wherein an axial distance from the third axial location to the second axial location defines a rim depth which is less than the cone depth.

6. The piston of claim 5 wherein the rim depth is between about 1 millimeter and about 3 millimeters, and wherein the cone depth is equal to about 3 millimeters or greater.

7. The piston of claim 6 wherein the radius of curvature of the plurality of rim convex curve segments is equal to about 50 millimeters or greater.

8. The piston of claim 4 wherein the abrupt transition includes an annular re-entrant protrusion.

9. The piston of claim 1 wherein the abrupt transition includes an annular re-entrant protrusion.

10. The piston of claim 1 wherein the first concave curve segment adjoins the second concave curve segment.

11. The piston of claim 1 wherein the first concave curve segment adjoins the bowl convex curve segment.

12. The piston of claim 1 wherein the second concave curve segment adjoins the inner rim surface at the abrupt transition.

13. The piston of claim 11 wherein the second concave curve segment adjoins the inner rim surface at the abrupt transition.

14. The piston of claim 13 wherein the first concave curve segment adjoins the second concave curve segment.

15. The piston of claim 11 wherein the radius of curvature of the first concave curve segment is smaller than the radius of curvature of the second concave curve segment.

16. The piston of claim 11 wherein the radius of curvature of the first concave curve segment is larger than the radius of curvature of the second concave curve segment.

17. The piston of claim 1 wherein a first radius is defined as a distance from the longitudinal axis to the abrupt transition along a radial direction, and a second radius is defined as a distance from the longitudinal axis to a point where the outer rim surface adjoins the outer cylindrical surface along the radial direction, the radial direction being perpendicular to the longitudinal axis, and
    wherein a ratio of the first radius to the second radius is greater than or equal to about 0.5.

18. A piston for a compression ignition internal combustion engine, the piston comprising:
    a piston body including
        an outer cylindrical surface defining a longitudinal axis,
        a combustion face defining a combustion bowl, the combustion face including a compound bowl surface having an inner bowl surface and an outer bowl surface, and
        a compound rim surface having an outer rim surface adjoining the outer
    cylindrical surface and an inner rim surface adjoining the compound bowl surface;
    the combustion face further including a profile of rotation about the longitudinal axis, the profile of rotation including a compound bowl profile defining a bowl convex curve segment corresponding to the inner bowl surface and being bisected by the longitudinal axis, and further defining a plurality of concave curve segments outboard of the bowl convex curve segment and corresponding to the outer bowl surface, a radius of curvature of the bowl convex curve segment being smaller than a radius of curvature of the plurality of concave curve segments;

the profile of rotation further including a compound rim profile defining a plurality of linear curve segments corresponding to the outer rim surface, and further defining a plurality of rim convex curve segments corresponding to the inner rim surface, each convex curve segment of the plurality of rim convex curve segments adjoining one linear curve segment of the plurality of linear curve segments, a radius of curvature of the plurality of rim convex curve segments being larger than the radius of curvature of the plurality of concave curve segments;

the combustion face further including a first continuous transition from the inner bowl surface to the outer bowl surface, a second continuous transition from the inner rim surface to the outer rim surface, and an abrupt transition from the compound bowl surface to the compound rim surface; and wherein a first radius is defined as a distance from the longitudinal axis to the abrupt transition along a radial direction, a second radius is defined as a distance from the longitudinal axis to a point where the outer rim surface adjoins the outer cylindrical surface along the radial direction, the radial direction being perpendicular to the longitudinal axis, and a ratio of the first radius to the second radius is greater than or equal to about 0.5.

* * * * *